United States Patent [19]

Iwaki et al.

[11] Patent Number: 5,299,255
[45] Date of Patent: Mar. 29, 1994

[54] ELECTRONIC MAIL SYSTEM FOR TRANSMITTING INFORMATION VIA COMMUNICATION NETWORK

[75] Inventors: Hiroshii Iwaki, Yokohama; Akihiro Okada, Zama; Hideyuki Motoyama, Kawasaki, all of Japan

[73] Assignee: Fujitsu Limited, Kawasaki, Japan

[21] Appl. No.: 668,244

[22] Filed: Mar. 12, 1991

[30] Foreign Application Priority Data

Mar. 12, 1990 [JP] Japan ................................ 2-058048
Mar. 13, 1990 [JP] Japan ................................ 2-060021

[51] Int. Cl.⁵ .......................................... H04M 11/00
[52] U.S. Cl. .................................... 379/96; 370/61; 358/402
[58] Field of Search ..................... 379/93, 96-98, 379/51; 358/400, 402, 403, 407, 434-436, 438-441; 370/61

[56] References Cited

U.S. PATENT DOCUMENTS 3,925,622 12/1975 Robinson ............................ 379/51
4,506,111 3/1985 Takenouchi et al. ............... 379/96
4,713,780 12/1987 Schultz et al. ..................... 379/96
4,941,170 7/1990 Herbst ................................ 379/100
5,001,572 3/1991 Hashimoto et al. ................ 379/100
5,057,941 10/1991 Moriya .............................. 358/440

FOREIGN PATENT DOCUMENTS 60-223375 11/1985 Japan ................................ 379/100
63-146538 6/1988 Japan ................................ 379/96
63-316545 12/1988 Japan ................................ 370/61

Primary Examiner—Wing F. Chan

[57] ABSTRACT

An electronic mail processing device includes a magnetic disk with a control table. The device establishes a line between an originating terminal and a destination terminal designated by the originating terminal as a destination of electronic mail information and enters the destination into the control table provided on the magnetic disk as a wrong destination when the destination terminal performs no prescribed response operation to receive the electronic mail information. No electronic mail information is delivered to any of destinations entered into the control table. Thereby, once a destination is stored in the control table, a line is never connected to the destination terminal again, which prevents repeated wrong calls from being made to the same terminal.

10 Claims, 12 Drawing Sheets

| ITEM | MAIL FUNCTION | FUNCTION CODE (EXAMPLE) | MAIL FUNCTION (∴ SELECTION) | | | PARAMETER (=SHOWS BOUNDARY OF PARAMETER) |
|---|---|---|---|---|---|---|
| | | | INDIVIDUAL DELIVERY | BROADCAST DELIVERY | TIME DESIGNATED | |
| 1 | INDIVIDUAL COMMUNICATION | 100 | ○ | × | × | DESTINATION |
| 2 | BROADCAST DELIVERY | 110 | × | ○ | × | BROADCAST DESTINATION |
| 3 | TIME-DESIGNATED INDIVIDUAL DELIVERY | 120 | ○ | × | ○ | TIME-DESIGNATED =DETINATION |
| 4 | TIME-DESIGNATED BROADCAST DELIVERY | 130 | × | ○ | ○ | TIME-DESIGNATED = BROADCAST DESTINATION |

FIG. 11

ELECTRONIC MAIL SYSTEM FOR TRANSMITTING INFORMATION VIA COMMUNICATION NETWORK

BACKGROUND OF THE INVENTION

1. Field of the Invention

The present invention relates to an electronic mail system which delivers various types of electronic mail information, such as facsimiles, voices, text, etc., transmitted over a communication network to their respective destination terminals.

2. Description of the Related Art

With the recent spread of information communication service, the demand for a system for automatic delivery of various types of information, such as images, voices, text (characters), etc., to remote locations is increasing. To meet the demand, an electronic mail system has come into use which permits free transmission and reception of such information among various types of terminals, such as facsimile equipment, personal computers or telephone sets, over a communication network such as a public communication network.

The electronic mail system has a facility for storing mail information sent from a terminal temporarily in a mail center and delivering the stored mail information to a destination terminal or terminals at time and in a way (for example, one-to-one individual communication, one-to-N broadcast communication) which are specified by a user.

FIG. 1 illustrates the system configuration of a prior electronic mail system.

A number of terminals 1a, 1b, . . . , such as telephone sets, facsimile equipment, etc., are connected to an electronic mail processing apparatus (hereinafter referred to as a mail apparatus) 3 installed in the mail center via a public telephone network or a private telephone network 2.

In general, the electronic mail system provides electronic mail service to subscribers which are assigned their respective identification numbers (subscriber's numbers, ID).

To send mail information to the mail apparatus 3, a user operates push buttons of a telephone in accordance with the following procedure:

(1) The user dials the telephone number of the mail center.

(2) The mail center prompts the user through voice guidance to enter his or her identification number.

(3) The user operates push buttons to enter his or her identification number.

(4) The mail center prompts the user through voice guidance to specify a mail service (individual communication, broadcast communication, etc.) that he or she requests.

(5) The user operates push buttons to specify his or her mail service.

(6) The mail center prompts the user through voice guidance to enter the destination of the mail information.

(7) The user operates buttons to enter the destination (in the case of broadcast communication all the destinations are entered).

(8) The mail center prompts the user to send a message.

(9) The user transmits the message through telephone or facsimile.

In order to send mail information using a mail system it is required, as described above, that user operates buttons on a telephone to enter his or her subscriber's identification number, the type of a mail service that he or she requests, the destination number and so on. These input operations are troublesome and time-consuming. In the case of the one-to-N broadcast communication in particular, the user has to enter destination numbers in succession. Thus, problems arise in that the operations are troublesome and time-consuming and the possibility of operational errors increases.

If a destination number is entered in error, the mail apparatus 3 will send received mail information to the wrong destination. Thus, problems will arise in that others may be troubled by misdelivery of mail information and the leakage of confidential information may be caused.

The following measures have been taken to prevent misdelivery of mail information caused by misentry of destination numbers. That is, subscribers (terminals) of destination are classified into groups (grouping of destinations) and destination information (telephone numbers and facsimile equipment numbers) of subscribers is entered for each of groups, thereby restricting delivery of mail information to subscribers which are not entered (subscribers entered in other groups).

However, the destination grouping method requires that all the destinations should be entered beforehand, which is time-consuming. In the case of broadcast delivery to subscribers in a combination different from that of destinations entered in a group, the destinations of the subscribers have to be entered into the mail apparatus again. Thus, the destination grouping method is not easy to use.

SUMMARY OF THE INVENTION

It is an object of the present invention to decrease misdelivery of electronic mail information.

It is another object of the present invention to simplify operations for transmission performed by a user when sending electronic mail information from a terminal to a center.

According to an aspect of the present invention, in an electronic mail system in which electronic mail information transmitted from terminals connected to a communication network with destinations designated is delivered to designated terminals, an electronic mail processing device within a mail center has storage means for storing wrong destinations which are entered by entry means. The storage means may be implemented by a control table on a magnetic storage device.

The entry means, when a line is connected between a destination terminal and the electronic mail processing device, and the destination terminal designated by the originating terminal performs no prescribed response operation to receive electronic mail information after recognizing a call, enters the designated destination in the storage means as a wrong destination.

Delivery control means is provided, which, each time electronic mail information is received from an originating terminal, decides whether or not a destination of the mail information designated by the originating terminal has been entered into the storage means, performs a process of delivering the received electronic mail information to a destination terminal designated by the originating terminal when the designated destination is not stored in the storage means and performs no process of delivering the received electronic mail information to the destination terminal when the designated destination is stored in the storage means.

Moreover, when the destination designated by the originating terminal is stored in the storage means, the delivery control means informs the originating terminal that the destination designated by it is in error.

Upon receipt of electronic mail information from an originating terminal, the electronic mail processing device of the mail center transmits to a terminal designated by the originating terminal voice guidance that electronic mail information is transmitted from now. If, in this case, the designated terminal is a non-electronic mail terminal, it is not adapted to perform a prescribed operation to respond to the voice guidance. Thus, the entry means of the electronic mail device recognizes that the destination is in error by detecting no response, for example, and stores the destination in the storage means as a wrong destination.

The delivery control means compares a designated destination with all the wrong destinations stored in the storage means, delivers received electronic mail to the destination when it is not stored in the storage means, and cancels delivery of electronic information to the destination terminal when the destination is stored in the storage means.

Thereby, even if a wrong destination is designated repeatedly by another terminal or the same terminal, electronic mail information is never delivered to a terminal whose destination is stored in the storage means. Therefore, repeated wrong calls to the same terminal can be avoided and the possibility of leakage of confidential information due to misdelivery can be reduced.

According to another aspect of the present invention, a mail adapter, which is connected between a terminal and a telephone network, has a function of storing subscriber identification information of the terminal, a functional code specifying individual delivery, broadcast delivery, etc., and destination information. If, therefore, the user stores these pieces of information in the mail adapter beforehand, the user has only to send the information stored in the adapter in transmitting electronic mail information to the mail center. That is, there is no need for the user to input the subscriber identification information, destination information and so on, whereby the operation procedure is simplified considerably.

In the case of broadcast delivery in particular, simply by inputting the destination information of one of broadcast destinations, the destination information of other broadcast destinations can be sent from the mail adapter to the network, thus permitting considerable simplification of the operation procedure.

BRIEF DESCRIPTION OF THE DRAWINGS

FIG. 11 is a diagram illustrating a relationship between mail functions and parameters.

DETAILED DESCRIPTION OF THE PREFERRED EMBODIMENTS

Figure 1:
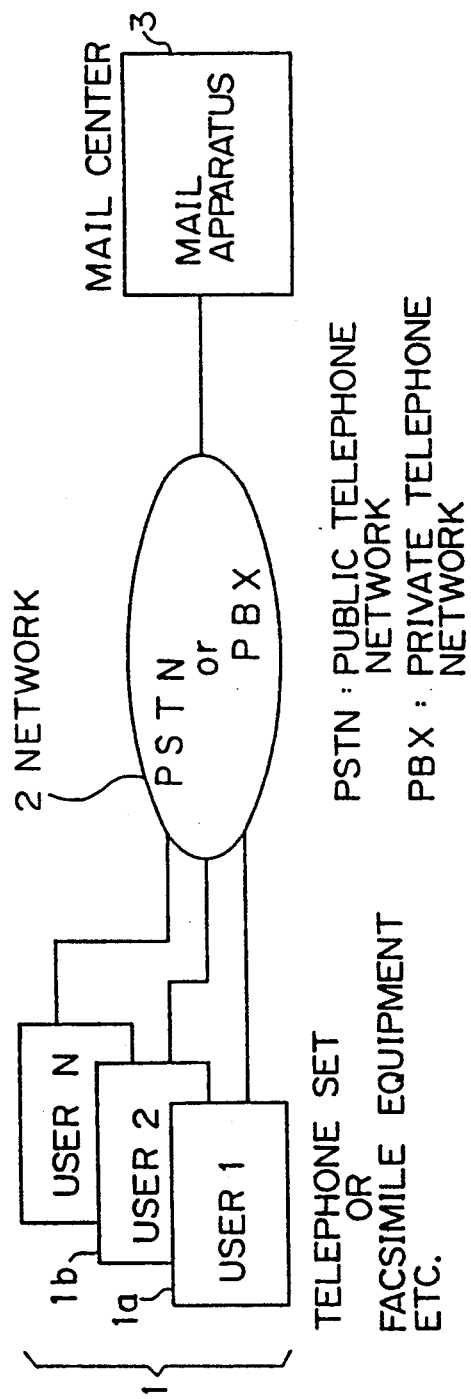
FIG. 1 diagrammatically illustrates a conventional electronic mail system.
Figure 2:
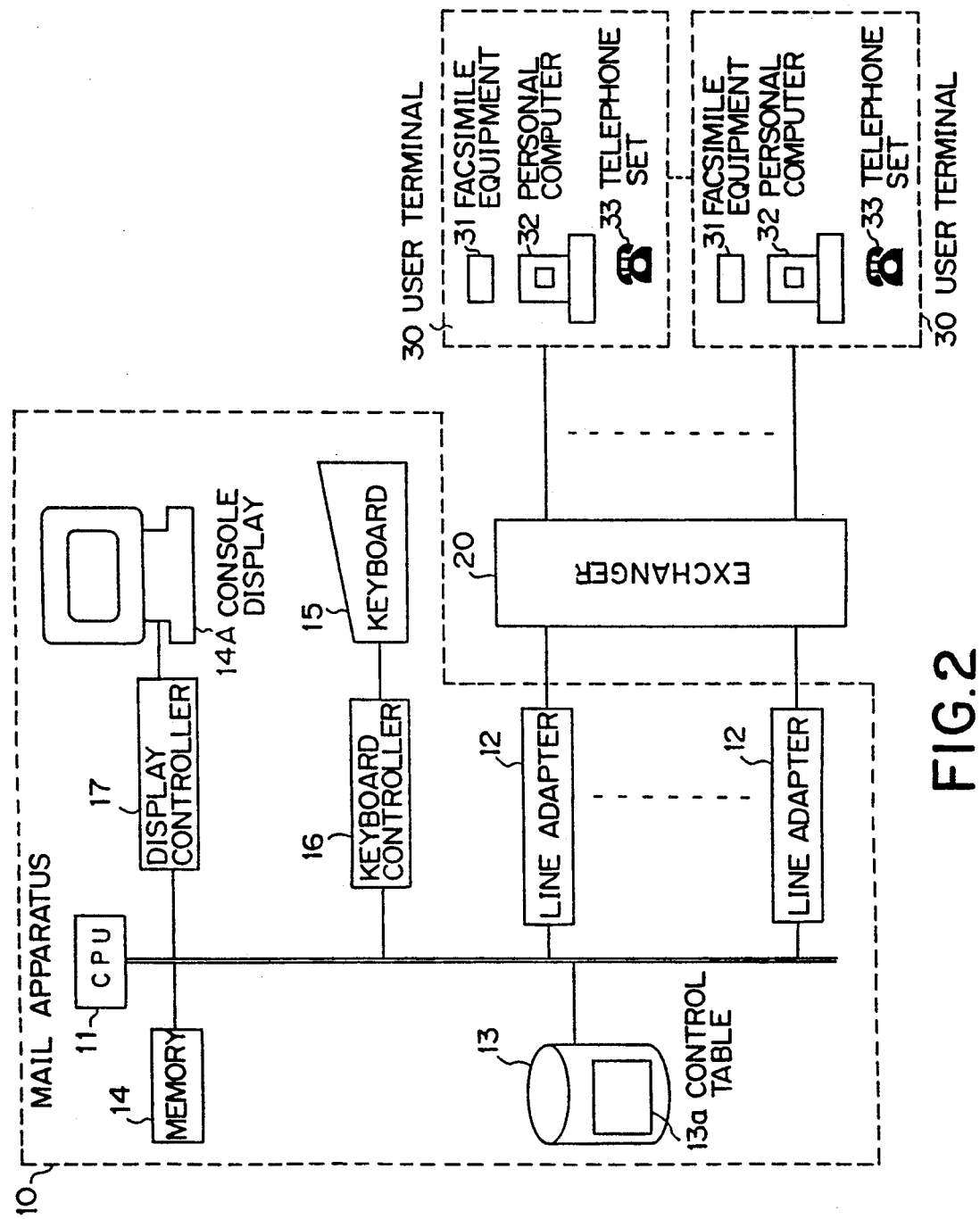
FIG. 2 illustrates an electronic mail system according to a first embodiment of the present invention.

Referring now to FIG. 2, an electronic mail system according to a first embodiment of the present invention includes a mail apparatus (an electronic mail processing apparatus) 10, enclosed by dashed lines, which has a central processing unit (CPU) 11 consisting of a microprocessor adapted to control the entire system. A plurality of line adapters 12 are adapted to transmit to or receive from user terminals including facsimile units 31, personal computers 32 and telephone sets 33 various types of information, such as image signals, text data, voice signals, etc., via an exchanger 20. A disk device 13 is a magnetic disk device or an optical magnetic disk device which stores receipt information received via the line adapters 12, subscriber information comprising subscribers' numbers (ID), subscribers' names and subscribers' passwords, and a delivery control table 13a.

The control table 13a is adapted to store wrong destinations. Each time transmission is made to a wrong destination, it is entered into the control table 13a. Upon receipt of a destination and information to be delivered via a line adapter 12 the CPU 11 retrieves the control table 13a in the disk device 13 so as to decide whether or not the destination of the destination information has been entered into the control table 13a. If, at this time, the destination is stored in the control table 13a, the CPU 11 determines that the specified destination is in error, performs no delivery to the destination and informs the originating station, via the line adapter 12 and exchanger 20, that the designated destination is in error.

A memory 14 is a semiconductor memory, such as a random access memory (RAM), which has a work area used by the CPU 11 to perform various processes. A console display 14A consists of, for example, a cathode ray tube (CRT) which makes image display for the work of entering and alteration of and reference to subscriber information or management information. The image display is made by a command entered by an operator of the mail apparatus 10 through a keyboard 15. The command entered by the operator through the keyboard 15 is fed into the CPU 11 via a keyboard controller 16 and interpreted by the CPU 11. Then the CPU 11 controls a display controller 17 to cause the console display 14A to make an image display corresponding to the entered command when the command is interpreted.

Reference numeral 30 denotes a user terminal which is used by a user to transmit various types of information to the mail apparatus 10 and which consists of facsimile equipment 31, personal computer 32 or telephone set 33. The user terminals 30 are connected to the mail apparatus 10 via the exchanger 20. Transmission and reception of various types of mail information are made among the terminals via the mail apparatus 10.

Each of the subscribers of the electronic mail system, who have their respective identification numbers and passwords entered beforehand, is allowed to transmit information to an arbitrary subscriber (a user terminal 30) by inputting his or her identification number and password.

Next, the operation of the electronic mail system described above will be described.

Figure 3:
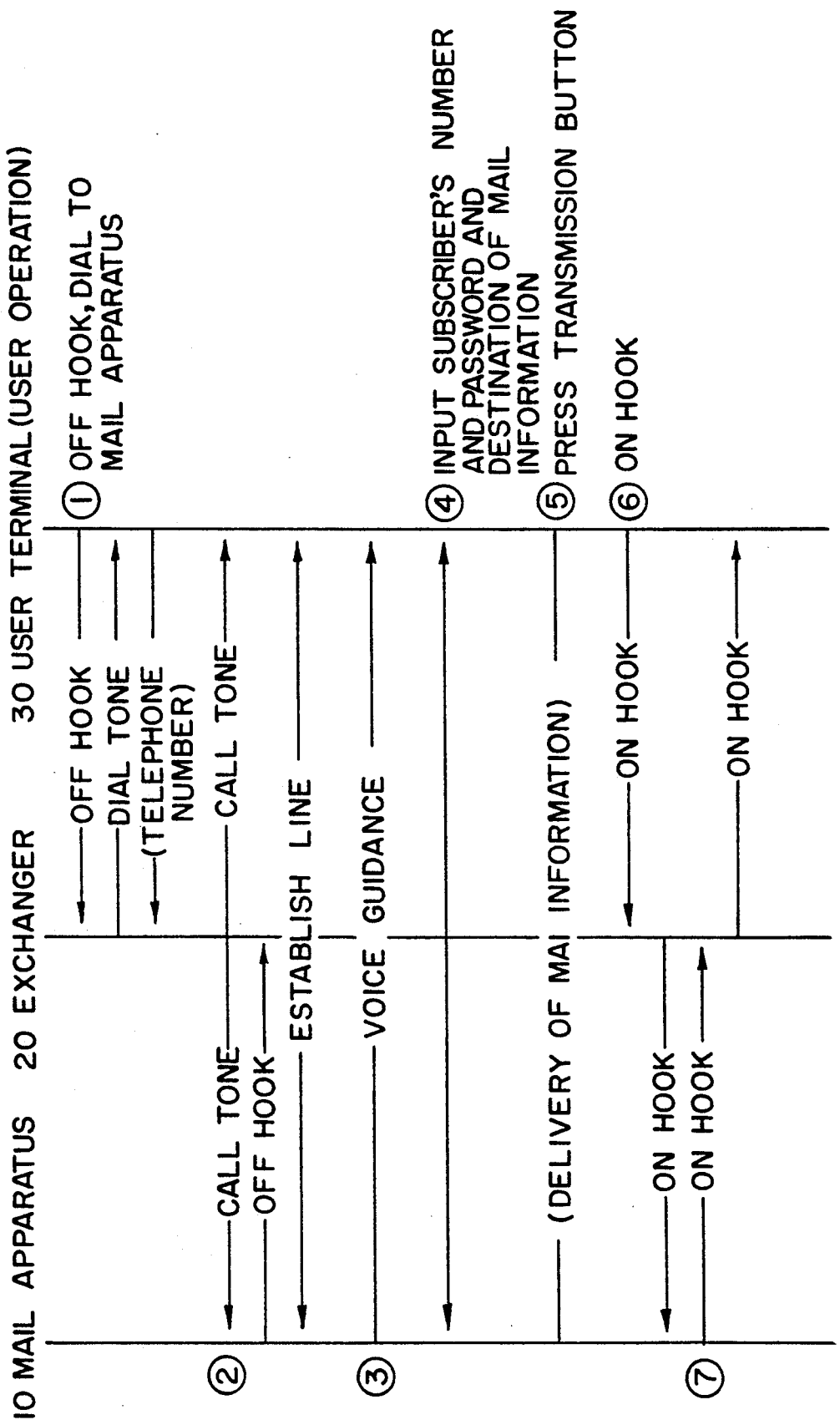
FIG. 3 is a diagram for use in explanation of the communication procedure when mail information is transmitted from a user terminal to the mail apparatus.

First, the operation of transmission of mail information to be delivered from a subscriber to another subscriber to the mail apparatus 10 will be described with reference to FIG. 3.

(1) First, upon receipt, a dial tone is transmitted from the exchanger 20 after the user (sender) has removed the receiver of his or her terminal 30 from its receptacle (the offhook state), the user dials a prescribed telephone number for connection to the mail apparatus 10.

(2) Subsequently, the exchanger 20 transmits a call tone to the mail apparatus 10. Upon detection of the call tone the mail apparatus 10 enters the offhook state automatically. Thereby, the user terminal 30 is connected to the mail apparatus 10 via the exchanger 20.

(3) The mail apparatus 10 transmits prescribed voice guidance to the user terminal 30 via the exchanger 20.

(4) The sender inputs his or her subscriber's ID, password and the destination of mail information using buttons in response to the voice guidance from the mail apparatus 10.

(5) Subsequently, the sender sends the mail information. If the user terminal 30 is facsimile equipment, the sender sets a sheet of paper on which the mail information is written on the facsimile equipment and then presses the receive button.

(6) The sender renders the user terminal 30 onhook after all the destination information (mail information) has been sent. The onhook state (an onhook signal) is transmitted to the mail apparatus 10 via the exchanger 20. The mail apparatus 10 writes the mail information sent from the user terminal into the disk device 13 under the control of the CPU 11.

(7) Upon detection of the onhook state of the sender, the mail apparatus 10 itself also enters the onhook state. The onhook state (an onhook signal) of the mail apparatus is transmitted to the user terminal 30.

The mail information sent from the user terminal 30 is stored in the mail apparatus 10 in that way.

The operation of the mail apparatus 10 to deliver received mail information to the designated destination after it has been received from arbitrary user terminal 30 in the manner described above will be described with reference to FIGS. 4 and 5.

Figure 4:
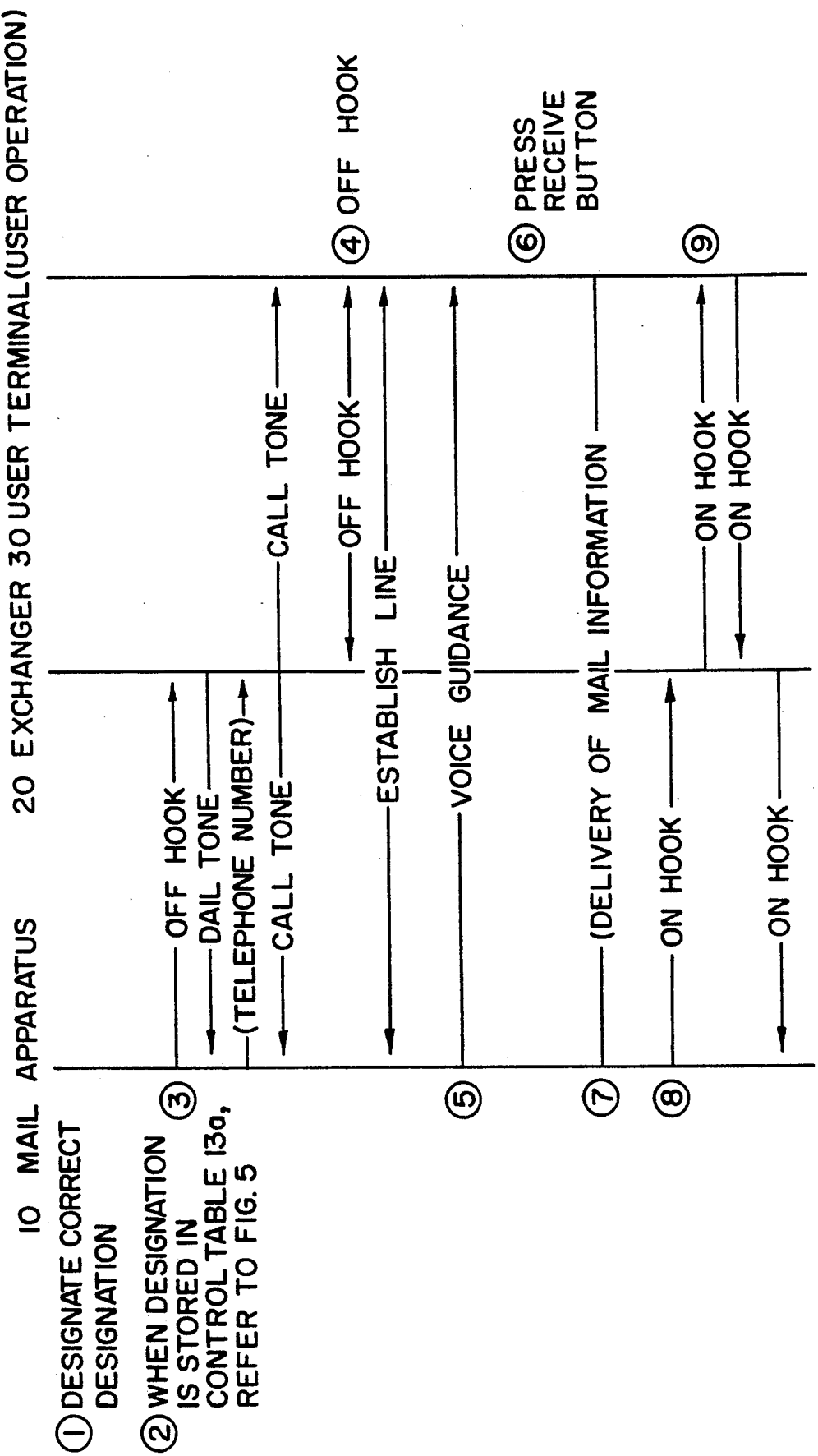
FIG. 4 is a diagram for use in explanation of the communication procedure when mail information is transmitted from the mail apparatus to a destination designated correctly by a sender.

FIG. 4 illustrates the communication procedure when the sender designates a correct destination.

(1) When the mail apparatus 10 receives destination information from the sender, the CPU 11 decides whether or not the received destination is stored in the control table 13a of the disk 13.

(2) When the designated destination is stored in the control table, the CPU cancels the process of delivering the received destination information (mail information) to the destination and performs a process of informing the sender that the destination is in error, which will be described later in connection with FIG. 6.

(3) If, on the other hand, the designated destination is not stored in the control table 13a, the mail apparatus 10 renders the exchanger 20 offhook. The exchanger 20 consequently transmits a dial tone to the mail apparatus 10. Upon receipt of the dial tone the mail apparatus 10 dials the telephone number of the destination terminal. Consequently the exchanger 20 transmits a call tone to the mail apparatus 10 and the destination user terminal 30.

(4) When the calling bell of the destination terminal rings in response to the call tone, the recipient renders the receiver offhook. When detecting the offhook state of the destination terminal, the exchanger 20 establishes a line between the mail apparatus 10 and the destination terminal 30.

(5) Upon detection of the establishment of the line, the mail apparatus 10 sends prescribed voice guidance to the destination terminal 30 via the exchanger 20.

(6) When deciding through the voice guidance that the mail information is to be received, the recipient performs an operation to allow the transmission of the mail information. If, for example, the user terminal 30 is facsimile equipment 31, the recipient presses the receive button.

(7) When the operation to allow transmission is performed by the recipient, the mail apparatus 10 reads the destination information (mail information) sent from the sender from the disk device 13 under the control of the CPU 11 and transmits it to the destination terminal 30 via the line adapter 12 and the exchanger 20.

(8) After all the mail information has been transmitted to the destination terminal, the mail apparatus 10 enters the onhook state. The destination terminal 30 is informed of the onhook state of the mail apparatus 10 through exchanger 20.

(9) Upon detection of the onhook state of the mail apparatus 10, the destination terminal 30 also enters the onhook state. The mail apparatus 10 is informed of the onhook state of the destination terminal 30 through the exchanger 20.

Note that, if the user terminal 30 are capable of automatic reception, the operations of the user terminal indicated at (4), (6) and (9) in FIG. 4 are performed automatically.

As described above, when the correct destination is designated by the originating user terminal 30, mail information sent from the originating user terminal is delivered correctly to the destination user terminal 30 via mail apparatus 10 in accordance with the communication procedure comprised of steps from (1) to (9) except step (2)) shown in FIG. 4.

Figure 5:
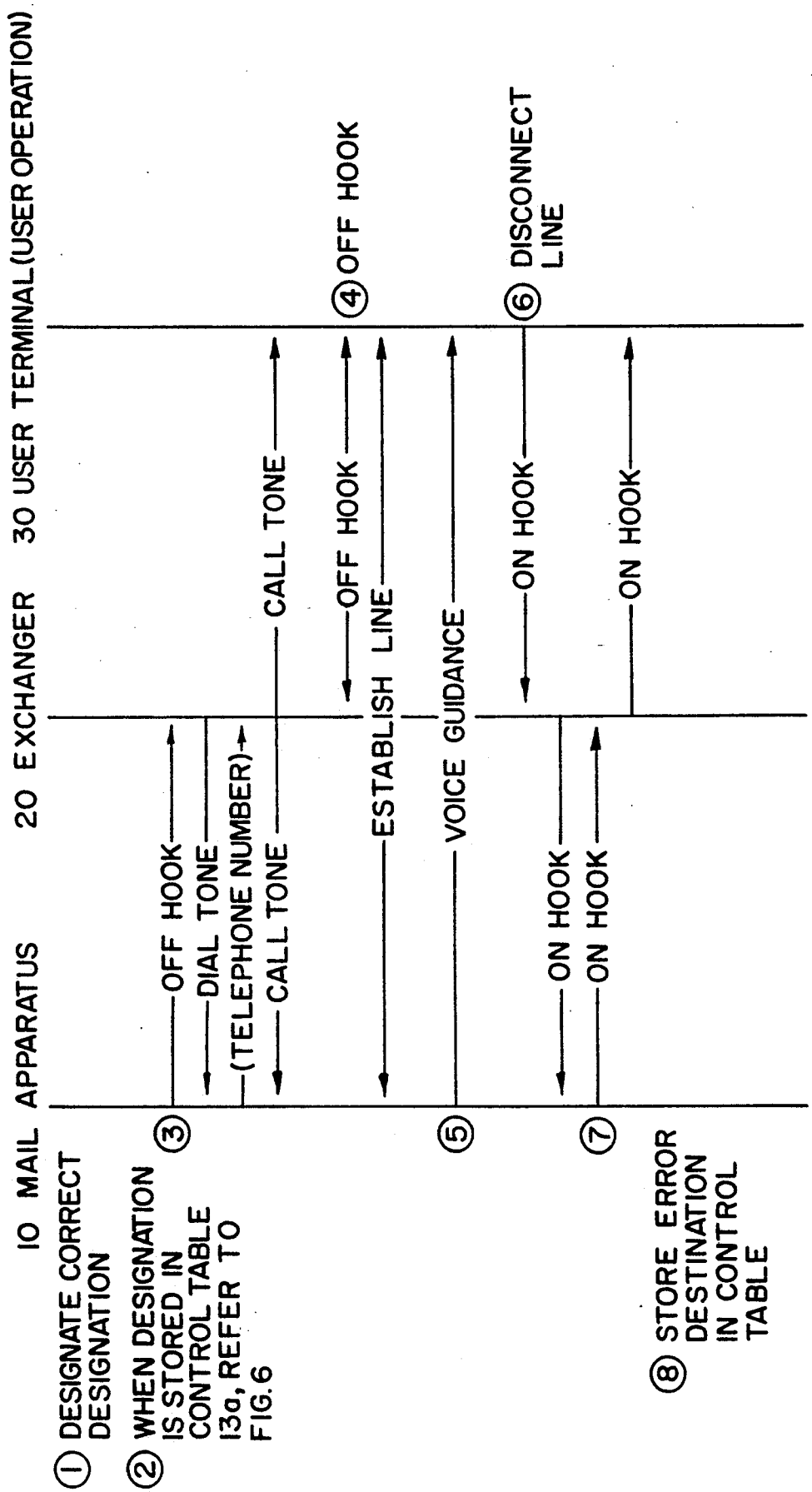
FIG. 5 is a diagram for use in explanation of the communication procedure when a wrong destination is designated.

FIG. 5 illustrates a communication procedure when an originating user terminal 30 sends destination information (mail information) with its destination designated in error.

(1) The CPU 11 of the mail apparatus 10 retrieves the control table 13a on the disk 13 and decides whether or not the destination has been entered into the control table 13a.

(2) If the destination is found in the control table 13a, the CPU 11 cancels the delivery of the mail information and informs the sender that the designated destination is in error, which will be described later in connection with FIG. 6.

(3) If, on the other hand, the designated destination is not found in the control table 13a, the CPU 11 renders the mail apparatus 10 offhook for delivery of mail information. Upon detection of the offhook state of the mail apparatus 10, the exchanger 20 transmits a dial tone to the mail apparatus 10. Upon receipt of the dial tone, the mail apparatus 10 dials the telephone number of the recipient. Upon receipt of the telephone number, the exchanger 20 transmits a call tone to the mail apparatus 10 and a user terminal 30.

(4) In response to the call tone the receive bell of the recipient's terminal 30 rings. When the recipient removes the receiver of the user terminal 30 from its receptacle (the offhook state), the exchanger 20 establishes a line between the mail apparatus 10 and the user terminal 31.

(5) Upon detection of the establishment of the line, the mail apparatus 10 sends prescribed voice guidance to the destination terminal 30 via the exchanger 20.

(6) When the recipient understands through the voice guidance that he or she was called by mistake, he or she renders the terminal onhook immediately without performing an operation to permit or not to permit the mail apparatus 10 to send the mail information. The onhook state of the user terminal is communicated to the mail apparatus 10 via the exchanger 20.

(7) Upon detection of the onhook state of the destination terminal 30, the mail apparatus 10 recognizes that the destination is in error. Then, the mail apparatus 10 renders itself onhook and enters that destination into the control table 13a on the disk 13 under the control of the CPU 11.

(8) Subsequently, the mail apparatus performs the communication procedure shown in FIG. 6 to inform the originating user terminal 30 that the designated destination is in error.

As described above, when a sender sends mail information with its destination mistaken, a recipient renders the receiver onhook immediately upon receipt of voice guidance from the mail apparatus 10 with the result that the mail apparatus 10 detects that the destination was designated in error and enters it into the control table 13a on the disk 13.

Upon receipt of mail information and its destination from an originating user terminal 30, the mail apparatus 10, prior to the delivery of the mail information, decides whether or not the destination has been entered into the control table 13a and cancels the mail delivery immediately when the destination is found in the control table. That is, once a destination is entered into the control table 13a, mail information is never delivered to that wrong destination again. This will prevent others from being troubled by repeated wrong calls.

Figure 6:
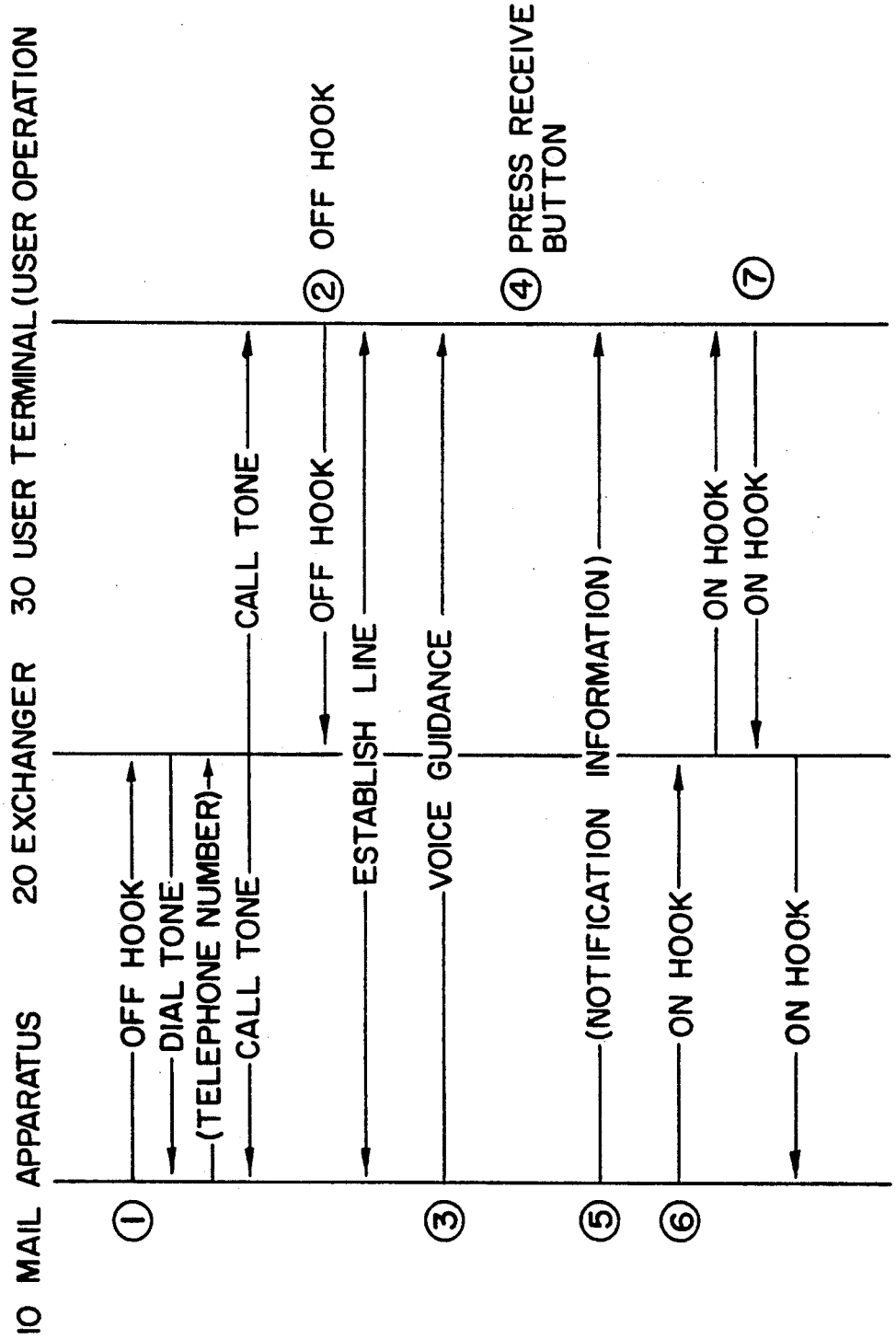
FIG. 6 is a diagram for use in explanation of the communication procedure when the mail apparatus informs a sender that a destination was designated in error.

FIG. 6 illustrates the communication procedure used in the case where, when a sender makes an error in destination, the mail apparatus 10 informs the sender that the destination is in error.

(1) When detecting that the destination is in error, the mail apparatus 10 puts itself offhook and then dials the telephone number of the sender who made an error in destination. Upon receipt of the telephone number, the exchange 10 transmits a call tone to the mail apparatus 10 and the terminal 30 of the mail sender.

(2) The mail sender puts the receiver offhook when the receive bell of his or her terminal 30 rings in response to the call tone.

Upon detection of the offhook state of the mail sender terminal, the exchanger 20 establishes a line between the mail apparatus 10 and the mail sender terminal 30.

(3) Upon detection of the line connection, the mail apparatus 10 transmits prescribed voice guidance to the mail sender terminal 30.

(4) Upon receipt of the voice guidance through the receiver, the mail sender performs an operation on his or her terminal 30 to permit transmission to the mail apparatus 10. If, for example, the user terminal 30 is facsimile equipment 31, the mail sender presses the sending button.

(5) Upon detection of the operation on the user terminal 30, the mail apparatus 10 transmits to the mail sender information that the destination is in error.

(6) The mail apparatus 10 puts itself onhook at the completion of the transmission of the information. Upon detection of the onhook state of the mail apparatus 10, the exchanger 20 transmits an onhook signal to the mail sender terminal 30.

(7) Upon detection the onhook state of the mail apparatus 10 through the user terminal 30, the mail sender puts his or her terminal 30 onhook.

Note that, if the mail sender terminal 30 is capable of automation reception, the operations (2), (4) and (7) are performed automatically.

In this way, when a sender makes an error in destination, information that the destination is in error is transmitted from the mail apparatus 10 to the sender terminal 30.

As described above, according to the present embodiment, when an error in destination occurs, the wrong destination is entered into the control table 13a immediately and, when a like destination error occurs again, it can be detected immediately upon receipt of electronic mail information addressed to the wrong destination, so that no line is established. It, therefore, becomes possible to circumvent a situation in which wrong calls are made repeatedly even when a request for retransmission of electronic mail information is made, which is a facility of the electronic mail system.

In the present embodiment, a terminal which makes no response to voice guidance from the mail apparatus 10 (that is, the terminal, which is made in an onhook state without designating permission/non-permission of receipt of the mail information after receiving a call) is regarded as a non-electronic mail terminal with no receiving function. The telephone number of the terminal is entered into the control table 13a as a wrong destination. When a destination which has been entered into the control table 13a is designated by another sender, it is processed as a wrong destination by the mail apparatus 10. Any mail information is never delivered to the destination after it has been entered into the control table.

With such a configuration, in case where, after calling, a recipient puts the receiver onhook by mistake to thereby disconnect a line, even a correct destination will be entered into the control table 13a undesirably. In this case, the recipient is allowed to inform the mail apparatus 10 that the receiver was put onhook by mistake, so that the destination information entered into the control table can be corrected. That is, in the mail apparatus 10 side, the contents of the control table 13a can be displayed on the display 14 through the operation of the keyboard 15 and the operator can rewrite destination information entered into the control table 13a, thereby deleting a destination entered by mistake.

If telephone numbers similar to those of destinations which are high in the frequency at which mail information is transmitted or destinations to which important information is transmitted are entered into the control table 13a beforehand (for example, telephone numbers which differ from those of destinations only in area code), the possibility of leakage of confidential information due to misdialling will be reduced. For mail information is never delivered to such a terminal as has a similar telephone number.

Next, a second embodiment of the present invention will be described with reference to FIGS. 7 through 12.

The embodiment relates to a mail adapter connected between a user terminal and a telephone line for sending the subscriber's number (ID) and password and the telephone number of the mail center automatically onto the telephone line.

Figure 7:
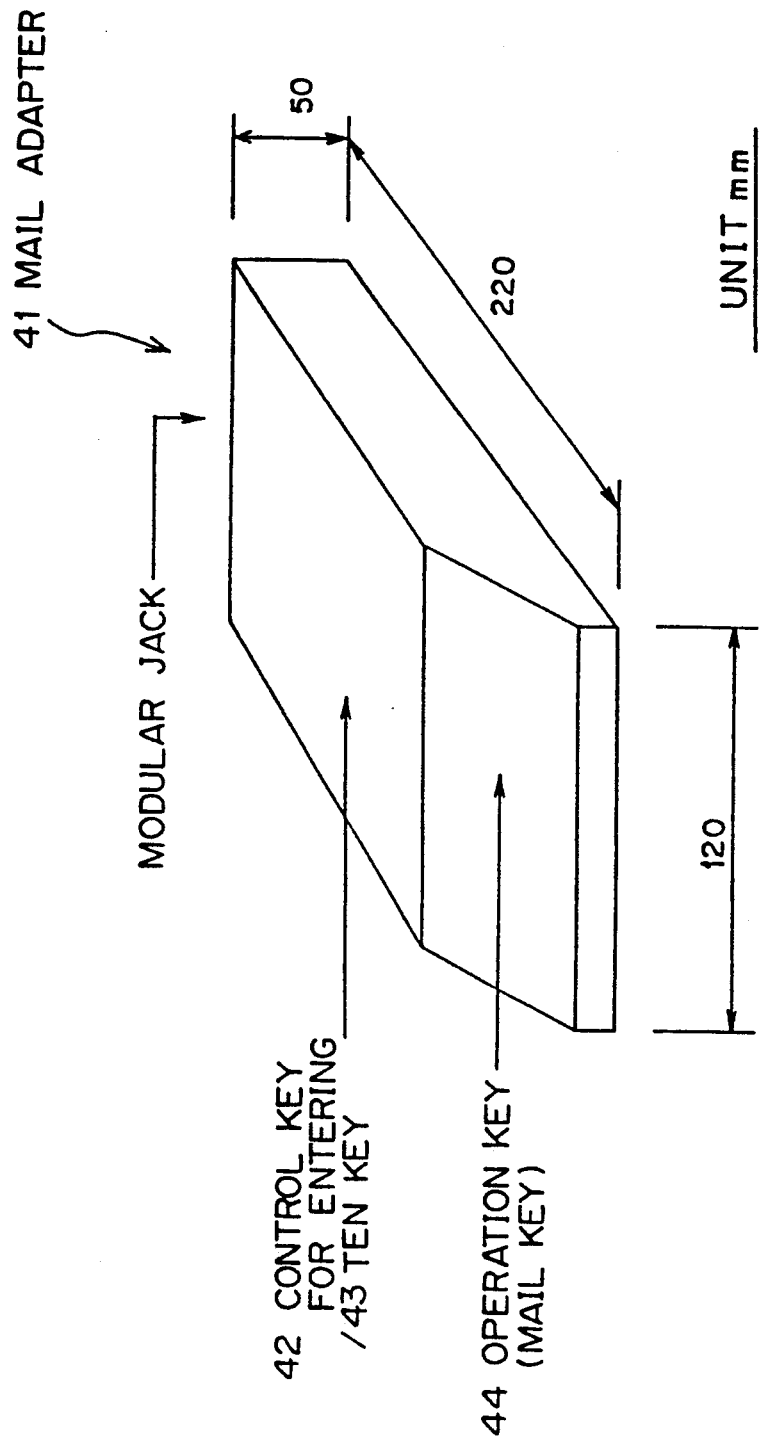
FIG. 7 is a schematic perspective view of a mail adapter of a system according to a second embodiment of the present invention.

FIG. 7 is an exterior view of a facsimile mail adapter (FMA) 41 according to the second embodiment.

Though not shown in particular, the adapter is provided, on its top surface, with control keys 42 for entering the subscriber's number of a facsimile connected to the adapter, the password, the telephone number of the mail apparatus, functional codes (codes corresponding to mail functions such as individual communication, broadcast communication, etc.) and parameters such as destination telephone numbers and a numeric keypad 43 including ten keys with figures 0 to 9, a * key and a # key.

Moreover, the adapter is provided, on its front surface, with an operation key (mail key) 44 operated by the user at the time of the transmission of facsimile. By operating the mail key 44 the subscriber's number, a functional code and so on can be transmitted to the mail apparatus in the form of DP/PB signals.

Furthermore, the adapter is provided, on its back surface, with modular jacks for connection to a terminal and a telephone line.

Figure 8:
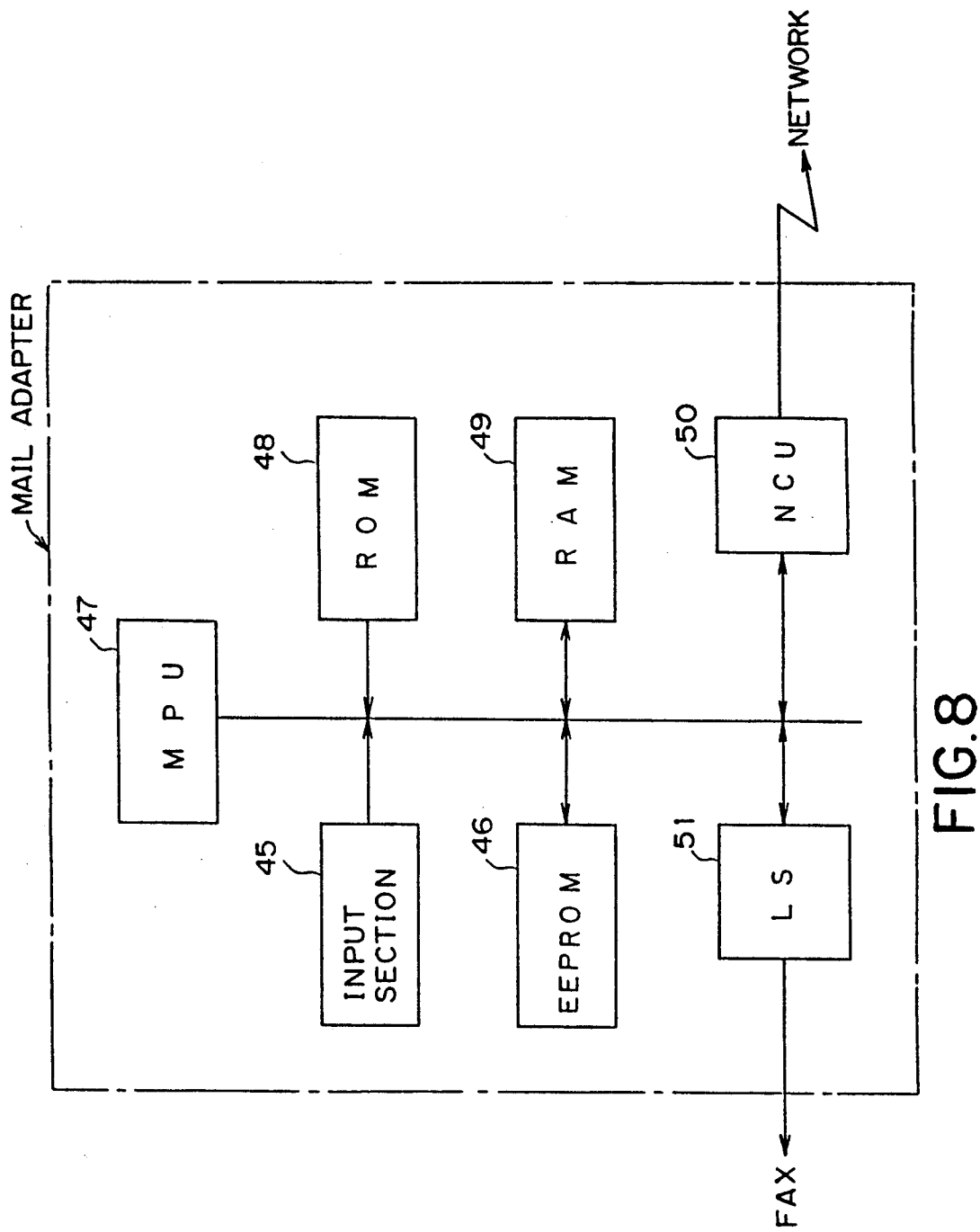
FIG. 8 is a block diagram of the mail adapter of FIG. 7.

FIG. 8 is a block diagram of the mail adapter 41. An input section 45 is comprised of the control keys 42, the mail key 44 and so on. Data, such as the subscriber's number, the functional codes and the destination telephone number, entered from the input section 45 is stored in an EEPROM 46 which is a nonvolatile memory.

In the present embodiment, the input section 45 is provided with function keys (not shown) for entering the subscriber's number, the functional codes and so on. These function keys and ten keys 43 are used to enter the subscriber's number, the password and so on.

Figure 9:
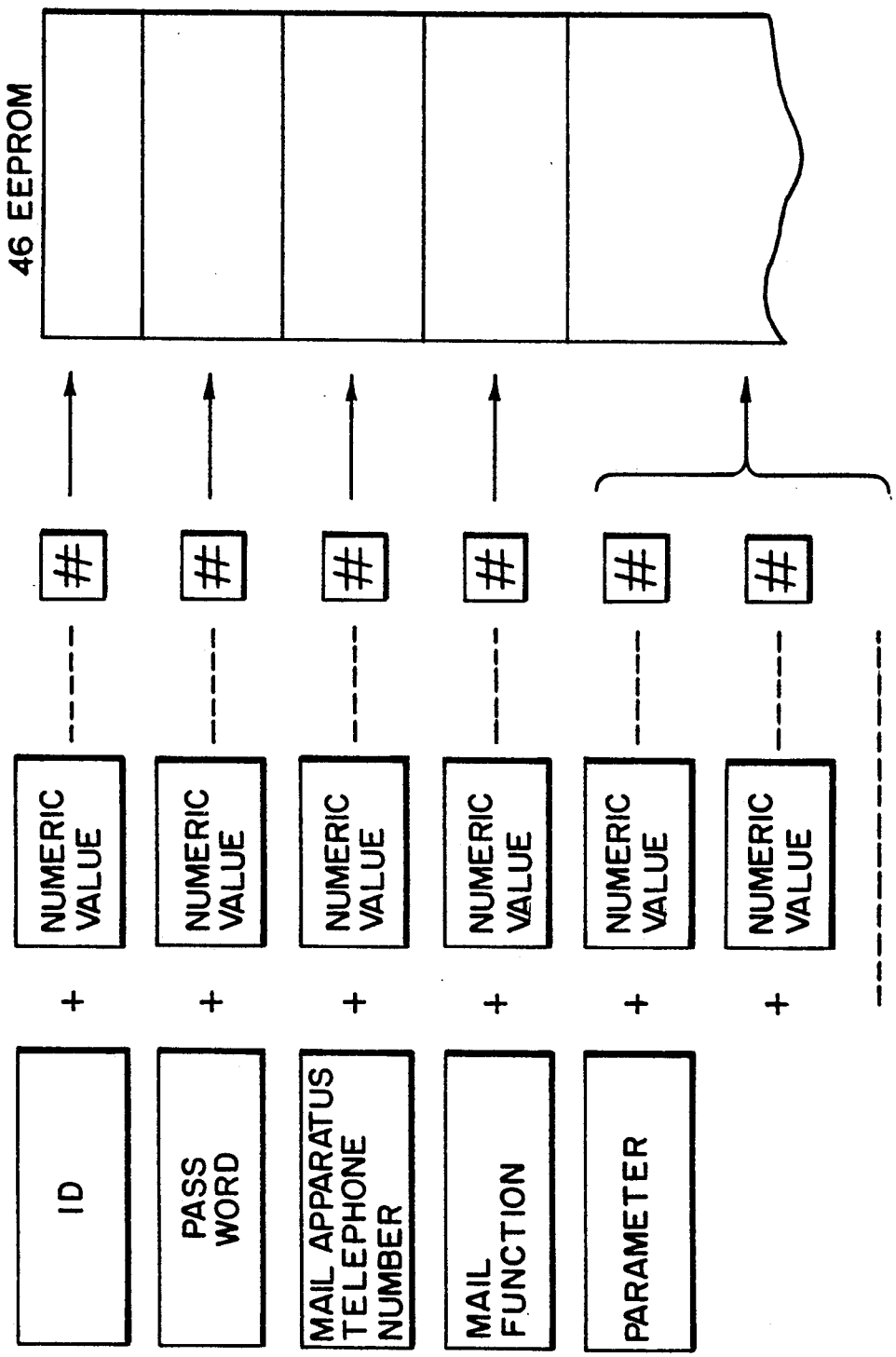
FIG. 9 is a schematic diagram of the EEPROM of FIG. 8.

FIG. 9 is a diagrammatical representation of a correspondence of memory areas of the EEPROM 46 to the function keys of the input section 45 as described above. A numeric value entered following the operation of each function key is stored in a corresponding memory area.

The EEPROM 46 has memory areas adapted to store a 10-digit subscriber's identification number, a 10-digit password, a 20-digit telephone number of the mail center, a 5-digit function code and a 400-digit parameter.

Returning to FIG. 8, an MPU 47 is a central processing unit for writing data into the EEPROM 46 and sending the data in a prescribed communication procedure under the control of a program stored in the ROM 48. A RAM 49 is a memory adapted to temporarily store a destination number entered from the facsimile equipment by a user.

The mail adapter 41 is provided with an NCU (network control unit) 50 for converting data to a DP/BP signal and transmitting it to a public telephone network and an LS (line set) 51 which serves as an interface with the terminal. The mail adapter 41 is connected to the telephone network and the terminal by the NCU and the LS.

Figure 10:
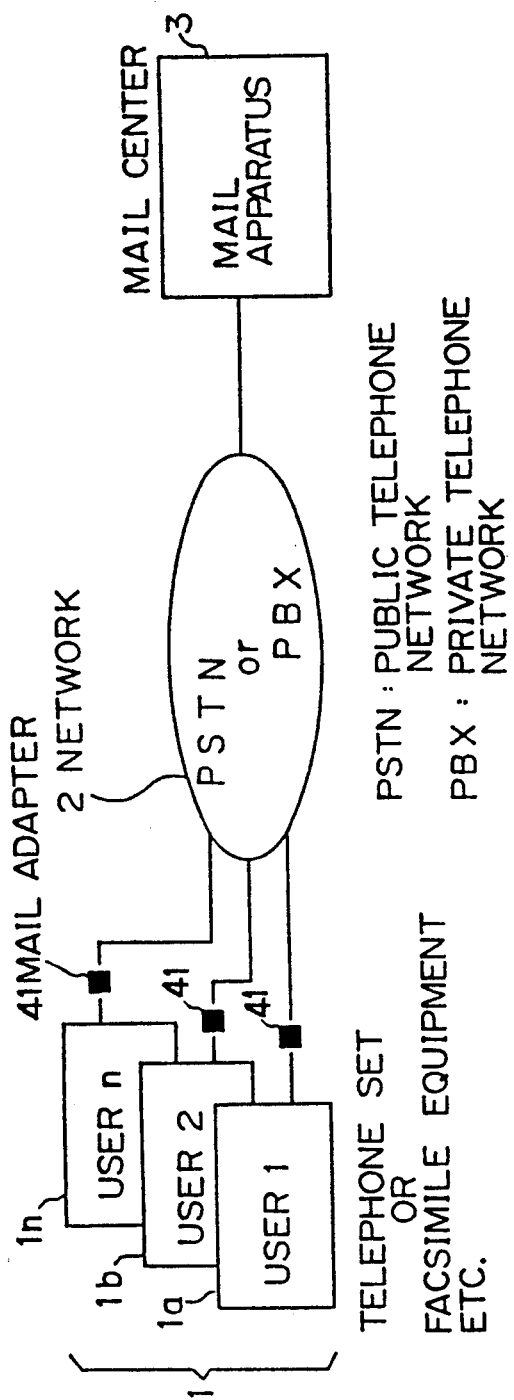
FIG. 10 illustrates an electronic mail system according to a second embodiment of the present invention.

FIG. 10 illustrates the electronic mail system according to the second embodiment. In the following description, like reference characters are used to denote corresponding parts to those in the conventional electronic mail system shown in FIG. 1 and their description will be omitted.

As shown, mail adapters 41 are connected between user terminals, for example, facsimile equipment, 1a, 1b, ... and network 2. To send a message from the facsimile apparatus 1 to the mail apparatus 3, the mail key 44 of the mail adapter 41 is operated. As a result, a call is made to the mail apparatus 3 using its telephone number which has been entered into the mail apparatus, so that the subscriber's number and a destination number which have been entered into the EEPROM 46 are sent to the mail apparatus 3.

The mail adapter 41 according to the present embodiment is provided with the following functions:

(1) A function of calling the mail center apparatus 3 by the use of the telephone number which has been entered into the mail adapter.

(2) A function of holding the corresponding facsimile terminal while the mail adapter 41 communicates with the mail apparatus 3.

(3) A function of sending the subscriber's identification number, the password, the function code and the parameter which have been entered into the mail adapter to the mail apparatus 3 in the form of DP/PB signals.

(4) A function of recognizing a call number from facsimile equipment to generate a parameter. This is, in the case of individual communication, to output a call number entered from the corresponding facsimile equipment as the destination number.

Here a functional code is a code determined to correspond to a mail function. For example, codes corresponding to one-to-one individual delivery (communication), one-to-N broadcast delivery (communication), time-designated individual delivery and time-designated broadcast delivery are determined as shown in FIG. 11. In the case of individual delivery, the entry of a parameter is omitted. In this case, a call number entered from facsimile equipment is recognized by the mail adapter 41 and then sent to the mail apparatus 3 as a destination number. In the case of broadcast delivery and time-designated broadcast delivery, broadcast destinations and designated time which have been entered as parameters are sent to the mail apparatus 3.

Next, the operation of entering data into the mail adapter 41 will be described.

A user first operates the function keys and the ten keys 43 to enter the telephone number of the mail apparatus 3, his or her subscriber's number and functional codes. At this point the user enters a password when necessary.

Next, in the case of the entry of destinations for broadcast delivery, the destination numbers are separated by the # key so that the # code is inserted between the destination numbers.

In the case of the entry of time and destination for time-designated individual delivery, time data is entered in the order of month, day, hour and minute. If, at this point, only time data is entered, absolute time designation results, while, if the the # code is inserted in the head of time data, relative time designation results. In the present case of individual delivery, time data has only to be entered as a parameter. The call number from the facsimile equipment is added as a parameter.

Moreover, in the case of the entry of time and destinations for time-designated broadcast delivery, time data is entered, the # key is operated to insert the # code, and then broadcast destination numbers are entered in succession with the # code inserted between the destination numbers.

Figure 12:
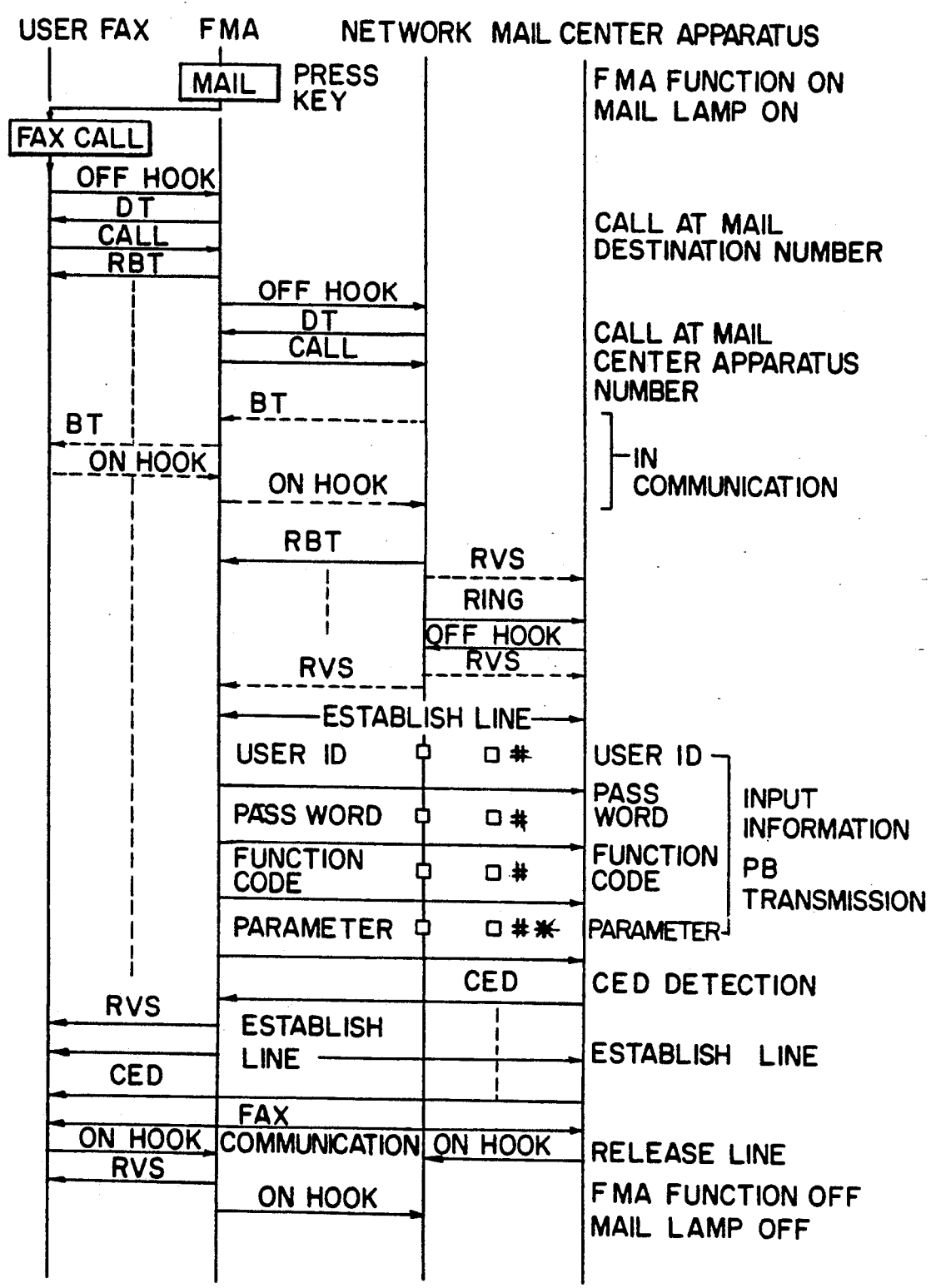
FIG. 12 is a diagram illustrating an operational sequence in the electronic mail system of the second embodiment.

Next, reference is made to FIG. 12 to describe the operation of sending a message from facsimile equipment to the mail apparatus 3 via the mail adapter after the subscriber's number, the telephone number of the mail apparatus 3 and the destination number have been entered.

A sender first presses the mail key 42 of the mail adapter 41 and puts his or her facsimile equipment offhook. Upon receipt of a dial tone (DT) from the telephone network, the sender presses the transmit button of the facsimile equipment to make a call. A calling signal is output to the telephone network via the mail adapter 41, so that a call (RING) is made to the mail apparatus 3 by the network.

At this point, the originating facsimile equipment produces a ringing tone (RBT) informing the sender that a call is being made.

When the called mail apparatus 3 enters the offhook state, the connection between the mail adapter 41 and the mail apparatus 3 is established. Subsequently, the subscriber's number, the password, the functional code and the parameters (the destination number, the designated time and so on) which have been entered beforehand by the user are converted to PB signals for transmission from the mail adapter 41 to the mail apparatus 3.

If, in this case, the functional code for broadcast delivery or time-designated broadcast delivery is entered, as mail function, into the mail adapter 41, the sender has only to input the destination number entered in the head of the parameter so as to perform broadcast delivery. That is, in the mail adapter 41, a comparison is made between the destination number entered from a facsimile equipment and the head destination number in the parameter memory area of the EEPROM 46 and, when the comparison indicates equality, the subsequent destination numbers are sent from the mail adapter 41 to the mail center apparatus 3.

The mail adapter 41 establishes a line between the mail adapter 41 and the originating facsimile equipment at the termination of the transmission of data, thereby permitting the transmission of messages therebetween.

As described above, by entering the telephone number of the mail apparatus 3, the subscriber's number, the mail functional codes and destination numbers into the mail adapter 41 beforehand and inserting the mail adapter 41 between the user terminal and the telephone network, a sender has only to perform the same operation as in the one-to-one individual delivery even in the case of broadcast delivery. Thus, the operation required of a user for broadcast delivery to many destinations can be simplified considerably.

As described above, according to the present embodiment, the mail adapter transmits destination numbers entered therein to the mail center instead of the user terminal in the case of individual delivery, broadcast delivery in which a message is delivered to plural destinations simultaneously, time-designated delivery and so on, whereby the operation on the side of the user terminal can be simplified considerably.

Broadcast destinations are limited to 1 group in the above embodiment, but a mail can be sent to a plurality of groups by selecting specific groups from different groups of broadcast destinations if a selection key and the corresponding memory area are provided for selecting a plurality of broadcast destinations.

The mail apparatus 10 and the mail adapter 41 may be applied not only to the facsimile mail system but also to other mail systems which transmit voice or image information.

For example, with an electronic mail by a personal computer, a message is displayed on a CRT of a destination terminal instead of a voice message being heard. If the destination terminal does not comprise a personal computer, an erroneous delivery can be detected in the same way as in the first embodiment, as a response to a prompt of whether or not the mail is permitted to be received is not made.

What is claimed is:

1. In an electronic mail system in which electronic mail information, transmitted from terminals connected to a communication network with designations designated, is delivered to designated terminals, comprising:
 a mail center including an electronic processing device,
 said electronic processing device comprising:
 storage means for storing wrong destinations of mail information;
 entry means for entering a designated destination in said storage means as a wrong destination when a line is connected between said electronic mail processing device and a terminal designated by an originating terminal as a destination of electronic mail information and said designated terminal makes a response that the destination is in error; and
 delivery control means for deciding whether or not a destination of said electronic mail information designated by said originating terminal has been entered into said storage means each time electronic mail information is received from said originating terminal, performing a process of delivering the received electronic mail information to the terminal designated by said originating terminal when the designate destination is not entered in said storage means and performing no process of delivering the received electronic mail information to said designated terminal when the designated destination is entered in said storage means;
 said delivery control means including means for informing said originating terminal that the destination is in error when the destination designated by said originating terminal is found in said storage means; and
 a mail adapter connected between a terminal and said communication network and comprising:
 terminal interfacing means for communicating signals with said terminal;
 network interfacing means for communicating signals with said communication network;
 storage means for storing destination information of a plurality of terminals registered as broadcast destinations assigned to broadcast groups;
 destination output means for receiving an inputted destination information inputted when a user of a terminal inputs a functional code specifying a broadcast and destination information specifying at least one terminal in broadcast destinations and comparing said inputted destination information with the destination information in each of said groups stored in said storage means and for outputting as the destination of the broadcast the destination information for the group having a coincident result in said comparison; and mail adapter converting means for converting information output from said destination output means to prescribed signals depending on said communication network and sending converted signals to said communication network via said network interfacing means.

2. In an electronic mail system comprising a mail center and in which electronic mail information, transmitted from terminals connected to a communication network with destinations designated, is received and delivered to designated terminals, an electronic processing device of the mail center comprising:

storage means for storing wrong destinations;

entry means for entering a designated destination in said storage means as a wrong destination when a line is connected between an originating terminal and a terminal designated by said originating terminal as the destination of electronic mail information and said designated terminal performs no prescribed response operation to receive said electronic mail information after recognizing a call; and delivery control means for deciding whether or not a destination of said mail information designated by said originating terminal has been entered into said storage means each time electronic mail information is received from the originating terminal, performing a process of delivering the received electronic mail information to the terminal designated by said originating terminal when the designated destination is not found in said storage means and performing no process of delivering the received electronic mail information to said designated terminal when the designated destination is found in said storage; said delivery control means including means for informing said originating terminal that the destination is in error when the destination designated by said original terminal is found in said storage means.

3. An electronic mail system according to claim 2, in which said entry means is constructed so as to enter the designated destination into said storage means as a wrong destination when a line is connected between a terminal designated as a destination of mail information and said electronic mail processing device and the designated terminal performs no response operation to permit the reception of electronic mail information after said designated terminal has recognized a call.

4. An electronic mail system according to claim 2, in which said entry means enters a designated destination into said storage means as a wrong destination when a line is connected between a terminal designated as a destination of mail information and said electronic mail processing device and the designated terminal disconnects the line without performing a response operation to permit the reception of electronic mail information after said designated terminal has recognized a call.

5. An electronic mail system according to claim 2, in which said entry means is constructed to enter the designated information into said storage means as a wrong destination when a line is connected between a terminal designated as a destination of mail information and said electronic mail processing device and the designated terminal performs no response operation to permit the reception of electronic mail information after said designated terminal has recognized a call, and said informing means is constructed to inform said originating terminal that the destination is in error when the designated destination is entered into said storage means as a wrong destination.

6. An electronic mail system according to claim 2, in which said storage means is a control table for storing destination information about wrong destinations.

7. In an electronic mail system comprising a mail center and in which electronic mail information, transmitted from terminals connected to a communication network with destinations designated, is delivered to designated terminals, an electronic processing device of said mail center comprising:

storage means for storing wrong destinations of mail information;

entry means for entering a designated destination in said storage means as a wrong destination when a line is connected between said electronic mail processing device and a terminal designated by an originating terminal as a destination of electronic mail information and said designated terminal makes a response that the destination is in error; and delivery control means for deciding whether or not a destination of said electronic mail information designated by said originating terminal has been entered into said storage means each time electronic mail information is received from said originating terminal, performing a process of delivering the received electronic mail information to the terminal designated by said originating terminal when the designated destination is not entered in said storage means and performing no process of delivering the received electronic mail information to said designated terminal when the destination designation is entered in said storage means; said delivery control means including means for informing said originating terminal that the destination is in error when the destination designated by said originating terminal is found in said storage means.

8. An electronic mail system according to claim 7, and further comprising a mail adapter connected between a terminal and said communication network, said mail adapter comprising:

terminal interfacing means for communicating signals with said terminal;

network interfacing means for communicating signals with said communication network;

storage means for storing a subscriber's identification number, a functional code and at least one piece of destination information which are entered by the user of said terminal; and mail adapter converting means for converting said subscriber's identification number, said functional code and said at least one piece of destination information stored in said storage means of said mail adapter to prescribed signals depending on said communication network and sending converted signals to said communication network via said network interface means based on a transmission instruction by the user and when instructed by the user.

9. In an electronic mail system in which electronic mail information, transmitted from terminals connected to a communication network with destinations designated, is delivered to designated terminals, a mail adapter connected between a terminal and said communication network comprising:

terminal interfacing means for communicating signals with said terminal;

network interfacing means for communicating signals with said communication network;

storage means for storing destination information of a plurality of terminals registered as broadcast destinations assigned to broadcast groups;

destination output means for receiving an inputted destination information inputted when a user of a terminal inputs a functional code specifying a broadcast and destination information specifying at least one terminal in broadcast destinations and comparing said inputted destination information with the destination information in each of said groups stored in said storage means and for outputting as the destination of the broadcast the destination information for the group having a coincident result in said comparison; and mail adapter means for converting an information output from said destination output means to prescribed signals depending on said communication network and sending converted signals to said communication network via said network interfacing means.

10. An electronic mail system according to claim 9, in which said destination output means is constructed to compare at least one piece of destination information entered from said terminal and a destination information entered into said storage means as broadcast destinations when broadcast delivery is designated by the user and to read other destination information following said destination information as additional destinations of the broadcast delivery when a comparison indicates equality.

* * * * *